US012782954B2

(12) United States Patent
Sterling

(10) Patent No.: US 12,782,954 B2
(45) Date of Patent: Nov. 3, 2026

(54) APPARATUS AND METHOD FOR POSITIONING EQUIPMENT RELATIVE TO A DRILL HOLE

(71) Applicant: Universal Field Robots Pty Ltd, QLD (AU)

(72) Inventor: Jeffrey James Sterling, Eagle Farm (AU)

(73) Assignee: Universal Field Robots Pty Ltd, Qld (AU)

( * ) Notice: Subject to any disclaimer, the term of this patent is extended or adjusted under 35 U.S.C. 154(b) by 443 days.

(21) Appl. No.: 18/278,204

(22) PCT Filed: Feb. 22, 2022

(86) PCT No.: PCT/AU2022/050127
§ 371 (c)(1),
(2) Date: Aug. 22, 2023

(87) PCT Pub. No.: WO2022/174307
PCT Pub. Date: Aug. 25, 2022

(65) Prior Publication Data

US 2024/0134388 A1 Apr. 25, 2024
US 2024/0231375 A9 Jul. 11, 2024

(30) Foreign Application Priority Data

Feb. 22, 2021 (AU) ................................ 2021900461

(51) Int. Cl.
*G05D 1/243* (2024.01)
*G05D 1/246* (2024.01)
(Continued)

(52) U.S. Cl.
CPC ......... *G05D 1/2435* (2024.01); *G05D 1/2462* (2024.01); *G05D 1/248* (2024.01);
(Continued)

(58) Field of Classification Search
CPC ..... G05D 1/2435; G05D 1/248; G05D 1/2462
See application file for complete search history.

(56) References Cited

U.S. PATENT DOCUMENTS 8,612,084 B2 * 12/2013 Hennessy ............ G05D 1/0278
342/36
12,000,974 B2 * 6/2024 Bloomfield .............. B25J 13/08
(Continued)

FOREIGN PATENT DOCUMENTS

CL 2016001781 A1 3/2017
CL 2016001780 A1 5/2017
(Continued)

OTHER PUBLICATIONS

International Search Report from PCT/AU2022/050127. 9 pages.
(Continued)

*Primary Examiner* — Ramsey Refai
(74) *Attorney, Agent, or Firm* — Pierson Ferdinand LLP; Rachel H. Huffstetler

(57) ABSTRACT

An automated vehicle with a control unit and a scanning portion including one or more scanning devices configured to scan an area of terrain in the vicinity of the estimated location of the drill hole in order to determine an actual location and condition of the drill hole, and to generate a point cloud representing at least a portion of the interior of the drill hole. The vehicle also has at least one arm associated with the scanning portion and an end effector associated with the at least one arm. The end effector configured to perform one or more operations. Upon generating the point cloud, the arm is configured, based on the point cloud, to position the end effector in substantial alignment with the drill hole.

20 Claims, 3 Drawing Sheets

(51) Int. Cl.

| | |
|---|---|
| ***G05D 1/248*** | (2024.01) |
| *G05D 101/20* | (2024.01) |
| *G05D 105/05* | (2024.01) |
| *G05D 107/70* | (2024.01) |
| *G05D 111/10* | (2024.01) |
| *G05D 111/20* | (2024.01) |
| *G05D 111/30* | (2024.01) |
| *G05D 111/63* | (2024.01) |

(52) U.S. Cl.
CPC ..... *G05D 2101/20* (2024.01); *G05D 2105/05* (2024.01); *G05D 2107/70* (2024.01); *G05D 2111/17* (2024.01); *G05D 2111/20* (2024.01); *G05D 2111/30* (2024.01); *G05D 2111/64* (2024.01)

(56) References Cited

U.S. PATENT DOCUMENTS

| | | | | |
|---|---|---|---|---|
| 2012/0103598 | A1* | 5/2012 | Nadeau | E21B 44/00 166/245 |
| 2012/0179322 | A1* | 7/2012 | Hennessy | G05D 1/0278 701/25 |
| 2013/0255939 | A1 | 10/2013 | Kumaran et al. | |
| 2014/0074319 | A1 | 3/2014 | McHugh et al. | |
| 2016/0341041 | A1 | 11/2016 | Puura et al. | |
| 2017/0356292 | A1 | 12/2017 | Wang | |
| 2020/0190967 | A1 | 6/2020 | Gooneratne et al. | |
| 2021/0318463 | A1* | 10/2021 | Bloomfield | G01V 11/002 |

FOREIGN PATENT DOCUMENTS

| | | | |
|---|---|---|---|
| WO | 2020/051620 | A1 | 3/2020 |
| WO | 2020/077405 | A1 | 4/2020 |

OTHER PUBLICATIONS

Written Opinion from PCT/AU2022/05012. 4 pages.
Notification of Transmittal of International Preliminary Report from PCT/AU2022/05012, 25 pages.
Australian Examination Report No. 1 issued in App. No. AU2022221587, dated Jul. 29, 2024, 1-3 pages.
Australian Examination Report No. 2 issued in App. No. AU2022221587, dated Mar. 7, 2025, 1-4 pages.
Chilean Search Report issued in CL2023002483 dated Feb. 3, 2025, 1-3 pages.

* cited by examiner

APPARATUS AND METHOD FOR POSITIONING EQUIPMENT RELATIVE TO A DRILL HOLE

This application is a national stage application under 35 U.S.C. 371 and claims the benefit of PCT Application No. PCT/AU2022/050127, having an international filing date of Feb. 22, 2022, which designated the United States, which PCT application claims the benefit of Australian Provisional Patent Application No. 2021900461, filed Feb. 22, 2021, the entire disclosure of each of which are incorporated by reference herein.

TECHNICAL HELD

The present invention relates to an apparatus and a method for positioning equipment relative to a drill hole.

BACKGROUND

Drilling is a critical process in mining. Drill holes are strategically located in rock to be mined to as to produce the most efficient and optimal rock fragmentation for subsequent removal and/or processing of the fragmented rock.

If drill hole trajectories deviate from the desired pattern significant issues, such as build-ups, hang-ups and poor rock fragmentation can occur. These issues can lead to extra drilling, loss of drill strings, ore dilution, ore loss, increased explosive consumption, time wastage, and delays in downstream processing stages. As a result, the impact of drill hole deviations can be felt throughout the entire production cycle.

In addition, the determination of the orientation and condition of a drill hole can be difficult (particularly using automated machinery) because the ground surface around a drill hole may be broken and uneven. This can lead to difficulty in determining certain parameters relating to the drill hole, such as its orientation and centreline.

Thus, there would be an advantage if it were possible to provide a fast and accurate manner in which to identify the location, orientation and/or condition of a drill hole prior to blasting so that the issues associated with adverse drill hole conditions can be reduced or eliminated and/or the correct placement of downhole tools can be determined quickly and accurately.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide an apparatus and a method for positioning equipment relative to a drill hole which may at least partially address one or more of the problems or deficiencies mentioned above or which may provide the public with a useful or commercial choice.

With the foregoing in view, in a first aspect the present invention resides broadly in an automated vehicle comprising:

- a control unit configured to control movement of the automated vehicle to a location adjacent an estimated location of a drill hole;
- a scanning portion including one or more scanning devices configured to scan an area of terrain in the vicinity of the estimated location of the drill hole in order to determine an actual location of the drill hole, and to generate a point cloud representing at least a portion of the interior of the drill hole;
- at least one arm associated with the scanning portion, the at least one arm configured to move the scanning portion between a home position and one or more scanning positions; and
- an end effector associated with the at least one arm, the end effector being configured to perform one or more operations;

wherein, upon generating the point cloud, the at least one arm is configured, based on the point cloud, to position the end effector in substantial alignment with the drill hole so that the end effector can perform the one or more operations.

The automated vehicle may be any suitable vehicle, Preferably, the automated vehicle may be any suitable powered vehicle. For instance, a suitable powered vehicle may include a tractor, a harvester, a loader, a backhoe, a bobcat or an excavator. In a particular embodiment of the invention the automated vehicle is an excavator. Preferably, the automated vehicle comprises a boom and a suitable attachment portion configured to removably attach the scanning portion to the at least one arm. In some embodiments of the invention, one or more conduits may be associated with the automated vehicle. The one or more conduits may be of any suitable form, although it will be understood that the one or more conduits may be configured to provide a passageway for fluids and/or solids to flow into and/or out of the drill hole.

The conduits may comprise pipes, hoses, tubes, ducts or the like. The conduits may be rigid, flexible or a combination of the two. In a preferred embodiment of the invention, the conduits may be configured to convey a fluid (such as water, air or the like, or any suitable combination) into the drill hole, for example to clean the interior of the drill hole. In other embodiments of the invention, the conduits may be configured to convey a fluid (or a mixture of fluids and solids) such as water out of the drill hole. It is envisaged that the one or more conduits may be associated with a pump, blower or the like configured to convey the fluid and/or solid through the one or more conduits.

The outlet of the one or more conduits may be of any suitable form. For instance, in some embodiments of the invention, the outlet of the one or more conduits may be provided with one or more nozzles, jets or similar devices configured to direct and/or increase the velocity of the flow from the one or more conduits.

The control unit may control movement of the automated vehicle using any suitable technique. For instance, in some embodiments of the invention, the control unit may include, or be associated with, a Global Positioning System (GPS) unit. In this embodiment of the invention, the GPS co-ordinates of one or more drill holes may be known, and the control unit may control movement of the automated vehicle to a location in the vicinity of the GPS co-ordinates of the one or more drill holes.

In another embodiment of the invention, the automated vehicle may further include a vision system. Preferably, the vision system may comprise at least one vision sensor configured to detect a terrain. In an embodiment of the invention, the vision system may comprise at least one camera configured to detect a terrain. In a preferred embodiment of the invention, the vision system comprises at least one stereo camera configured to detect a terrain. It is envisaged that, in use, the camera may be used to detect a terrain and/or identify a feature thereof, such as an object, a person, a land formation or a hazard in the terrain. In an embodiment of the invention, the at least one camera may be positioned on the automated vehicle. For instance, the at least one camera may be positioned on top of the automated vehicle so as to have a substantially unimpeded view of the surrounding terrain. In a further embodiment, at least one camera may be positioned on the scanning portion and/or the at least one arm so as locate or identify the position of a feature of the terrain. Preferably, the automated vehicle and the at least one arm may each comprise a vision system comprising at least one vision sensor to detect a terrain and/or obstacles.

In an embodiment of the invention, the automated vehicle may be operated autonomously. In a further embodiment of the invention, the automated vehicle may operate semi-autonomously. In this embodiment, it is envisaged that the automated vehicle may be adapted to be controlled remotely by an operator. The operator may control the automated vehicle using any suitable technique. For instance, the operator may be provided with a controller that is connected by one or more wires to the automated vehicle. More preferably, the operator may control the automated vehicle remotely. In this embodiment of the invention, it is envisaged that a wireless connection may be provided between the operator and the automated vehicle. Thus, the operator may be located remotely to the automated vehicle. In some embodiments, a remote operator may be provided with an interface (such as a screen or other display device) that allows the operator to view and monitor the operation of the automated vehicle. In these embodiments, the remote operator may be capable of intervening in the operation of the automated vehicle at any time if, for instance, the automated vehicle is in danger of colliding with an object, is not operating optimally, is needed for a different task, has completed its task and so on. It is envisaged that the remote operator may be able to switch the automated machine between being operator controlled and being operated autonomously.

In some embodiments of the invention, the automated vehicle may be operated entirely autonomously. In this embodiment, the control unit may be provided with one or more predetermined rules relating to the terrain, features of the terrain, the end effector being used and the one or more tasks to be performed or the like, or any suitable combination thereof. Thus, it is envisaged that the automated vehicle may be operated solely by the control unit (and the rules contained therein). In this embodiment, it is envisaged that no human operator may be required.

In some embodiments, the at least one control unit may be adapted for connection via the Internet to a control device operated by the operator. In addition, it is envisaged that data generated by the vision system during use may be adapted to be read in real-time by a remote operator. The use of a Global Positioning System (GPS) may enable the location of the automated vehicle to be known by the remote operator.

It is envisaged that the control unit may include software. The software may be of any suitable form, although in some embodiments of the invention the software is embedded software. In an embodiment of the invention, the software may include state machine software, a behaviour tree, or the like. It is envisaged that, in use, the software may provide the logic for each element of a work task, control the sequence of the tasks to be completed, control functions of the automated machine, the scanning portion, the at least one arm and/or the end effector. Preferably, the software may be suitable for use with a machine learning system or an artificial intelligence. It is envisaged that in use, the scanning data that is collected during operation of the automated vehicle may be used in the machine learning system to improve the operation of the automated vehicle. By this it is meant that the operation of the automated vehicle may be improved by, for example, increasing the speed at which the vehicle completes a task or by improving the accuracy of the positioning of the automated vehicle relative to a drill hole. In addition, improved operation of the automated vehicle may include improved recognition of objects (such as drill holes) and/or improved placement of the end effector. Further, improved operation of the automated vehicle may include improved identification of and response to hazards, changes in operating conditions etc.

In a preferred embodiment, the machine learning system may be used to identify a feature of the terrain and react accordingly. For example, the machine learning system may learn to identify a person in the vicinity of the automated vehicle and to stop its operation, or move to a different area and continue operating. In a further example, the machine learning system may learn to identify a hazard in the terrain, such as dislodged rocks and learn to navigate around the hazard. In other embodiments of the invention, the machine learning system may learn to identify disturbed terrain around a drill hole and/or the location of the drill hole within the disturbed terrain.

In an embodiment of the invention, data from the vision system may be used by the control unit (and embedded software where present) to improve the movement of the automated vehicle and/or the at least one arm. In particular, data from the vision system may be used by the control unit (and embedded software where present) to improve the accuracy of a position calculation of the automated vehicle and/or the at least one arm. Data from the vision system may include scanned terrain data, sensed object data and combinations thereof. It is envisaged that data generated by the vision system may be used by the control unit (and embedded software where present) to improve movement of the automated vehicle and the at least one arm during use. In a preferred embodiment of the invention, data from the vision system may be used by the control unit (and embedded software where present) to prevent movement of the automated vehicle and the at least one arm during use. It is envisaged that data generated by the vision system may be used by the control unit (and embedded software where present) to avoid collision hazards in the terrain, such as people in vicinity of the automated vehicle and the at least one arm during use.

It is envisaged that an operator may transfer and receive data from the control unit. Suitable data may include GPS coordinates of features of the terrain, such as objects, land formations and hazards in the terrain, training data to aid in machine learning for new tasks, or updated instructions or rules.

It is envisaged that the estimated location of the drill hole may be based on any suitable information. For instance, the estimated location of the drill hole may be provided as GPS co-ordinates, or the estimated location of the drill hole may be determined by the automated vehicle. In this embodiment of the invention, the automated vehicle may (via the vision system, for instance) identify an estimated location of a drill hole based on an area of disturbed terrain or the like.

As previously stated, the automated vehicle includes a scanning portion associated with the at least one arm. The scanning portion includes one or more scanning devices configured to scan an area of terrain in the vicinity of the estimated location of the drill hole and to generate a point cloud representing at least a portion of the interior of the drill hole. The one or more scanning devices may be of any suitable type, although in a preferred embodiment of the invention at least one of the one or more scanning devices may comprise a ranging sensor. In some embodiments of the invention, a single scanning device may be provided that is configured to scan an area of terrain in the vicinity of the estimated location of the drill hole and to generate a point cloud representing at least a portion of the interior of the drill hole. Alternatively, a first scanning device may be provided to scan an area of terrain in the vicinity of the estimated location of the drill hole, while a second scanning device may be provided to generate a point cloud representing at least a portion of the interior of the drill hole.

It is envisaged that the one or more scanning devices may comprise stereo cameras, LIDAR laser scanners, radar devices, acoustic devices (such as acoustic ranging sensors) or the like, or any suitable combination thereof. In a particular embodiment of the invention, a first scanning device may be provided in the form of a stereo camera, while a second scanning device may be provided in the form of a LIDAR laser scanner.

In embodiments of the invention in which at least one of the one or more scanning devices comprises a stereo camera, the stereo camera of the scanning portion may be different to the stereo camera associated with the vision system. In an alternative embodiment the same stereo camera may be associated with both the scanning portion and the vision system.

The point cloud generated by the scanning portion may be of any suitable form, although it will be understood that in general a point cloud is configured to provide a 3-dimensional image of an objection (in this case, the interior of the drill hole). The point cloud may be generated across any suitable portion of the drill hole. For instance, the point cloud may be generated across the entire depth of the drill hole. More preferably, the point cloud may be generated for an upper portion of the drill hole. For instance, the point cloud may be generated to a depth of up to 10 metres into the drill hole. More preferably, the point cloud may be generated to a depth of up to 20 metres into the drill hole. Still more preferably, the point cloud may be generated to a depth of up to 50 metres into the drill hole.

It is envisaged that the point cloud may generate information regarding the drill hole. Any suitable information may be generated, although it is envisaged that the point cloud may generate information regarding at least the orientation and condition of the drill hole. It will be understood that the term “condition” may refer to any suitable factor, such as the presence of obstructions or blockages in the drill hole, the presence of water foreign objects or in the drill hole, and so on. By determining this information in the point cloud, a suitable end effector may be selected to perform a task (which may include clearing obstructions or blockages from the drill hole, removing water from the drill hole, placing explosives in the drill hole and so on).

In some embodiments of the invention, the point cloud may be used to determine a centreline of the drill hole. This may be achieved using any suitable technique. In a particular embodiment of the invention, however, it is envisaged that the point cloud may be substantially cylindrical (consistent with the interior of a drill hole). Thus, the centreline of the drill hole may be determined based on the orientation and dimensions of the substantially cylindrical point cloud. In this embodiment of the invention, it is envisaged that the end effector may be located in substantial alignment with the centreline of the drill hole so that the end effector can perform the one or more operations.

The at least one arm may be of any suitable form. Preferably, the arm comprises an attachment portion for exchangeable fastening of an end effector to the arm. The attachment portion may be of any suitable form, such as a coupling or the like. It is envisaged that the attachment portion may be conventional, and no further discussion of this is required.

In an embodiment of the invention, the at least one arm may be an excavator arm. In a further embodiment of the invention, the arm may comprise a manipulator such as, but not limited to, may be a robotic arm. Any suitable robotic arm may be provided, although in an embodiment of the invention, the robotic arm may be provided with at least 4 axes. Thus, the movement of the at least one robotic arm may have at least 4 degrees of freedom (4 DOF). In a preferred embodiment of the invention, the robotic arm may be provided with at least 5 axes, thus the movement of the at least one robotic arm may have at least 5 degrees of freedom (5 DOF). In a preferred embodiment of the invention, the robotic arm may be provided with at least 6 axes, thus the movement of the at least one robotic arm may have at least 6 degrees of freedom (6 DOF). In a further embodiment of the invention, the robotic arm may be provided with at least 7 axes, thus the movement of the at least one robotic arm may have at least 7 degrees of freedom (7 DOF). By replacing the degrees of freedom, it is possible to alter its mode of operation to suit different outdoor activities.

In a preferred embodiment of the invention, the scanning, portion may be associated with an end of the at least one arm. Preferably, the scanning portion may be associated with an opposite end of the at least one to the end of the at least one arm that is mounted to the automated vehicle.

It is envisaged that the scanning portion may be movable, using the at least one arm, between a home position and one or more scanning positions. In the home position, the scanning portion may be positioned relatively close to a body or chassis of the automated vehicle. It is envisaged that, hi the home position, the scanning portion is positioned such that, if the automated vehicle moves, the likelihood of the scanning portion impacting on an object within the terrain is reduced or eliminated. Thus, it is envisaged that the scanning portion may be located to the home position when the automated vehicle is moving (such as between drill holes). Conversely, it is envisaged that the scanning portion may be moved into the one or more scanning positions when the automated vehicle is substantially stationary.

Preferably, in the one or more scanning positions, the scanning portion may be actuated to scan the terrain around the estimated location of the drill hole in order to determine the actual location of the drill hole. The scanning portion may scan the terrain around the estimated location of the drill hole in any suitable pattern, and it will be understood that the actual scanning pattern is not critical to the invention.

As previously stated, the scanning portion is configured to determine the actual location, an orientation and/or a condition of the drill hole. It will be understood that the actual location is the location within the terrain in which the drill hole is actually located. The orientation of the drill hole is the direction into the earth at which the drill hole extends. The condition of the drill hole includes factors such as protruding rocks or blockages within the drill hole and the like that may cause damage to downhole equipment, prevent the charging of the drill hole with explosives and so on.

As previously stated, the scanning portion includes one or more scanning devices configured to survey the terrain, wherein the scanned terrain data is used by the control unit (and embedded software where present) to control the movement of the automated vehicle and the at least one arm.

In embodiments in which the scanning device comprises a stereo camera or LIDAR laser scanning device, it is envisaged that the scanning device may determine an actual location of the drill hole by scanning the terrain at the estimated location of the drill hole to generate digital 3-D representations of the terrain. It is envisaged that data generated by the scanning device may be used by the control unit (and embedded software where present) in addition to the data generated by the vision system (where applicable) to determine an actual location of the drill hole.

The automated vehicle may further comprise at least one sensor. In an embodiment of the invention, the automated vehicle may comprise at least one vehicle position sensor configured to sense the position of the automated vehicle in the terrain, wherein the sensed vehicle position is used by the control unit to establish a change in position in the terrain over time to autonomously control the steering and acceleration of the automated vehicle to a particular location in the terrain. In an embodiment of the invention, the automated vehicle may comprise at least one position sensor located on the at least one arm, wherein the position sensor is configured to sense the position of the at least one arm in the terrain, wherein the sensed arm position is used by the control unit to autonomously control the reach and angle of the at least one arm.

In an alternative embodiment of the invention, the automated vehicle may comprise at least one track encoder, the at least one track encoder being configured to establish a distance the automated vehicle has driven relative to a start position via wheel diameter or track length and speed of the automated vehicle.

In an embodiment of the invention, the automated vehicle may comprise at least one collision sensor, wherein the collision sensor is configured to sense collision hazards in the terrain, such as people in its vicinity.

As previously stated, the automated vehicle includes an end effector. The end effector may be associated with the at least one arm and/or the scanning portion, and may be movable relative thereto.

It is envisaged that upon generating the point cloud representing at least a portion of the interior of the drill hole, the at least one arm is configured to position an end effector in substantial alignment with the drill hole so that the end effector can perform one or more operations. The nature of the one or more operations may vary depending on the nature of the end effector, although in a specific embodiment of the invention, the one or more operations may include placing one or more tools into the drill hole, the one or more tools being configured to perform certain tasks such as, but not limited to, the placement of explosives in the drill hole. Further, the nature of the end effector may vary depending on the condition of the drill hole.

In some embodiments of the invention, the end effector may be associated with, or form part of, a wireline tool string. The end effector may, therefore, be configured to run wireline tools into and/or retrieve wireline tools from the drill hole. The wireline tools may be of any suitable form, and may include survey tools, pulling tools, slickline tools, running tools, a wireline grab, a blind box, a centraliser, fishing tools, shifting tools and the like, or any suitable combination thereof.

For example, if the point cloud generated by the scanning portion determined the presence of obstructions or blockages within the drill hole, the end effector may be a rock breakage tool configured to reduce or remove the obstruction or blockage. In other embodiments, the end effector may be configured to charge the drill hole with explosives, remove samples from the drill hole and so on.

It is envisaged that, at the conclusion of the performance of the one or more operations, the scanning portion may be moved to the home position and the automated vehicle may move to the estimated location of another drill hole. Alternatively, the automated machine may move to a different location at the completion of the task, for maintenance, repair and the like.

In a second aspect, the invention resides broadly in a method for positioning an end effector relative to a drill hole, the method comprising the steps of:

a) Positioning an automated vehicle adjacent an estimated location of the drill hole;
b) Scanning, using a scanning portion including one or more scanning devices associated with the automated vehicle, an area of terrain in the vicinity of the estimated location of the drill hole in order to determine an actual location of the drill hole and to generate a point cloud representing at least a portion of the interior of the drill hole; and
c) Positioning, based on the point cloud, an end effector, configured to perform one or more operations, in substantial alignment with the drill hole so that the end effector can perform the one or more operations.

In a third aspect, the invention resides broadly in a method for determining one or more parameters relating to a drill hole, the method comprising the steps of:

a) Scanning, using one or more scanning devices, an area of terrain in the vicinity of an estimated location of the drill hole in order to determine an actual location of the drill hole and to generate a point cloud representing at least a portion of the interior of the drill hole;
b) Determining, using the point cloud, the one or more parameters relating to the drill hole; and
c) Positioning, based on the one or more parameters, an end effector configured to perform one or more operations, in substantial alignment with the drill hole so that the end effector can perform one or more operations.

The one or more parameters may be of any suitable type. For instance, the one or more parameters may include the orientation of the drill hole, the centreline of the drill hole, the presence of obstructions in the drill hole, the condition of the drill hole, the presence of liquid in the drill hole and the like, or any suitable combination thereof.

The present invention provides numerous advantages over the prior art. For instance, the present invention provides an accurate record of the location, orientation and/or condition of one or more drill holes. When actions must be performed on the drill holes (such as the subsequent placement of explosives prior to blasting), the knowledge of the location, orientation and/or condition of the drill holes allows for the rapid and accurate placement of the explosives within the drill hole. Without the knowledge of the drill hole provided by the invention, it is not guaranteed that explosives may be positioned within the drill hole at the correct orientation. In addition, the presence of obstructions or blockages in the drill hole may prevent the positioning of explosives to the desired depth to provide an effective blast. Further, the accurate placement of explosives improves the safety and efficiency of the process.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

Figure 1:
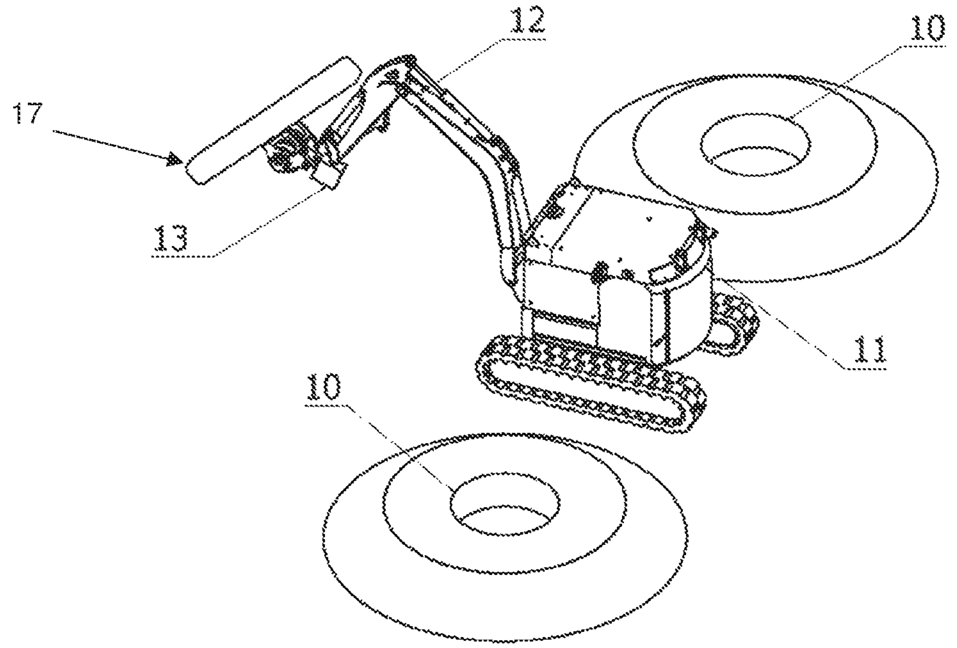
FIGS. 1-5 illustrate steps in a method for positioning an end effector relative to a drill hole according to an embodiment of the invention using an automated vehicle according to an embodiment of the invention.

FIG. 1 illustrates a step in a method for positioning an end effector 17 relative to a drill hole 10 according to an embodiment of the present invention. In this Figure, an automated vehicle 11 is moved using a control unit (obscured) to a location adjacent an estimated location of the drill hole 10. The automated vehicle 11 includes an arm 12 that is associated with a scanning portion 13 that includes a LIDAR laser scanner. In the embodiment shown in FIG. 1, the scanning portion 13 is shown in the home position, being the position the scanning portion 13 is positioned in when the automated vehicle 11 moves between locations.

Figure 2:
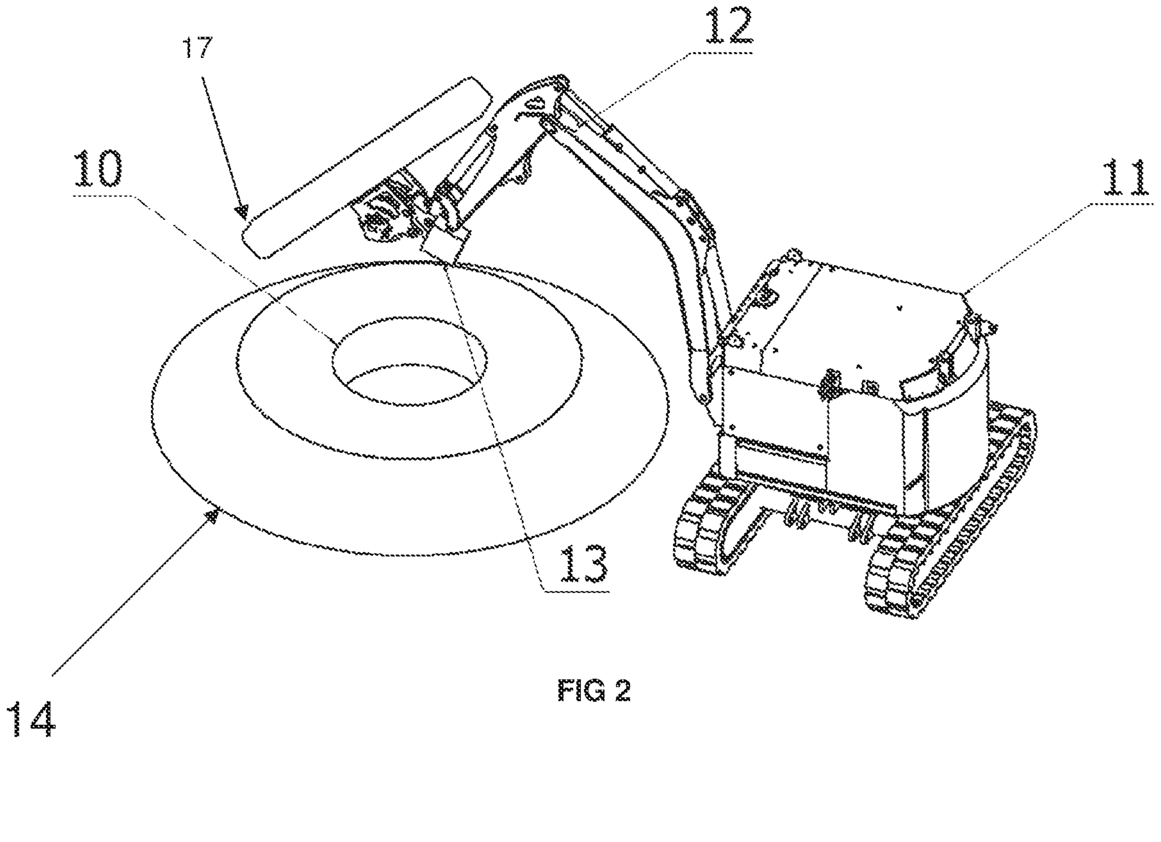

FIG. 2 illustrates a step in a method for positioning an end effector 17 relative to a drill hole 10 according to an embodiment of the present invention. In this Figure, the arm 12 moves the scanning portion 13 out of the home position and into a scanning position so that the LIDAR laser scanner can begin to scan the terrain 14 around the estimated location of the drill hole 10 in order to determine the actual location of the drill hole 10.

Figure 3:
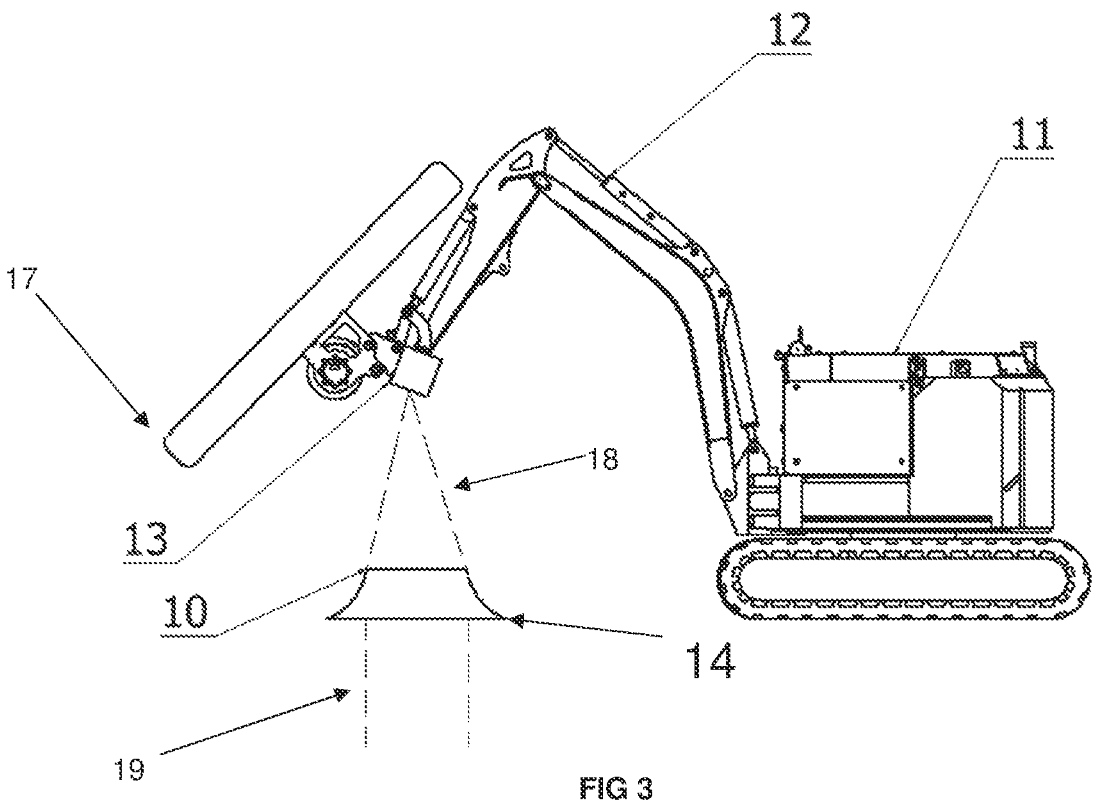

FIG. 3 illustrates a step in a method for positioning an end effector 17 relative to a drill hole 10 according to an embodiment of the present invention. FIG. 3 illustrates the scan 18 of the terrain 14 around the estimated location of the drill hole 10 that is generated by the LI DAR laser scanner. By scanning the terrain 14 around the drill hole 10, the scanning portion 13 determines the actual location of the drill hole 10, as well as the direction 19 in which the drill hole 10 extends into the ground, and the condition of the interior of the drill hole 10.

Figure 4:
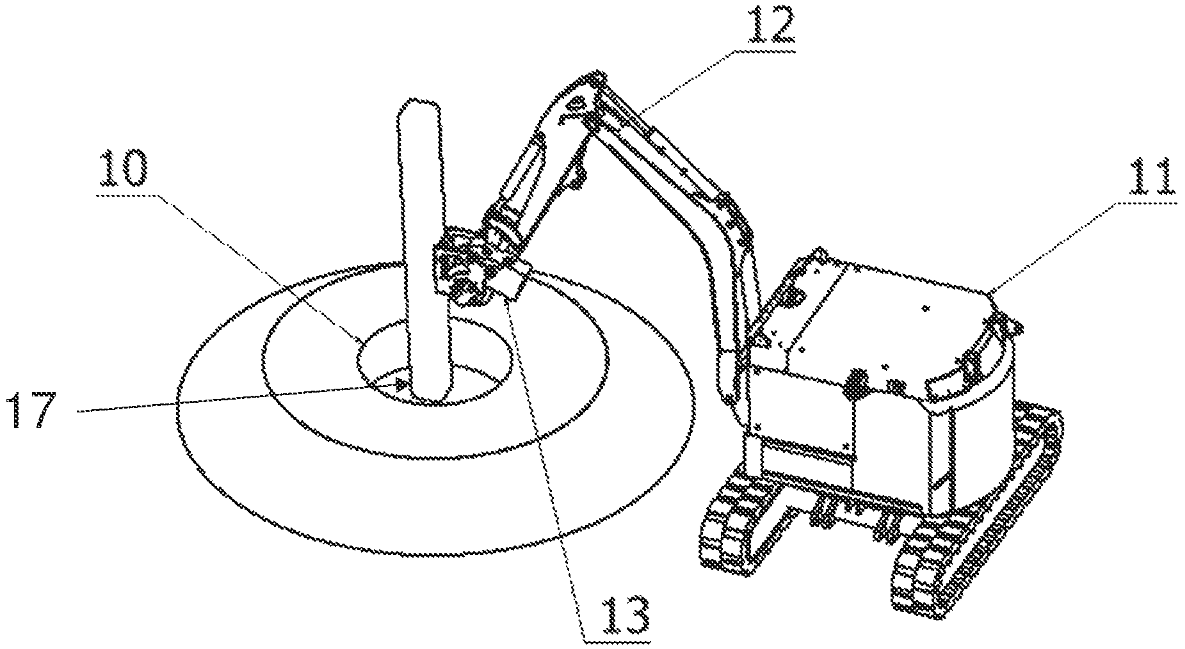

FIG. 4 illustrates a step in a method for positioning an end effector 17 relative to a drill hole 10 according to an embodiment of the present invention. In this Figure, once the control unit (obscured) associated with the automated vehicle 11 determines the actual location of the drill hole 20 based on the scan generated by the scanning portion 13, the arm 12 positions the scanning portion 13 so that an end of the scanning portion 13 is positioned adjacent to the opening of the drill hole 10. The arm 12 also positions the scanning portion 13 so that an end effector 17 associated with the scanning portion 13 is oriented in substantially the same direction as the direction in which the drill hole 10 extends into the earth. In this way, the end effector 17 may be inserted into the drill hole 10 to perform one or more operations. By aligning the end effector 17 with the drill hole 10, the likelihood of damage to the end effector 17 by coming into contact with the inner surface of the drill hole 10 may be reduced or eliminated.

Figure 5:
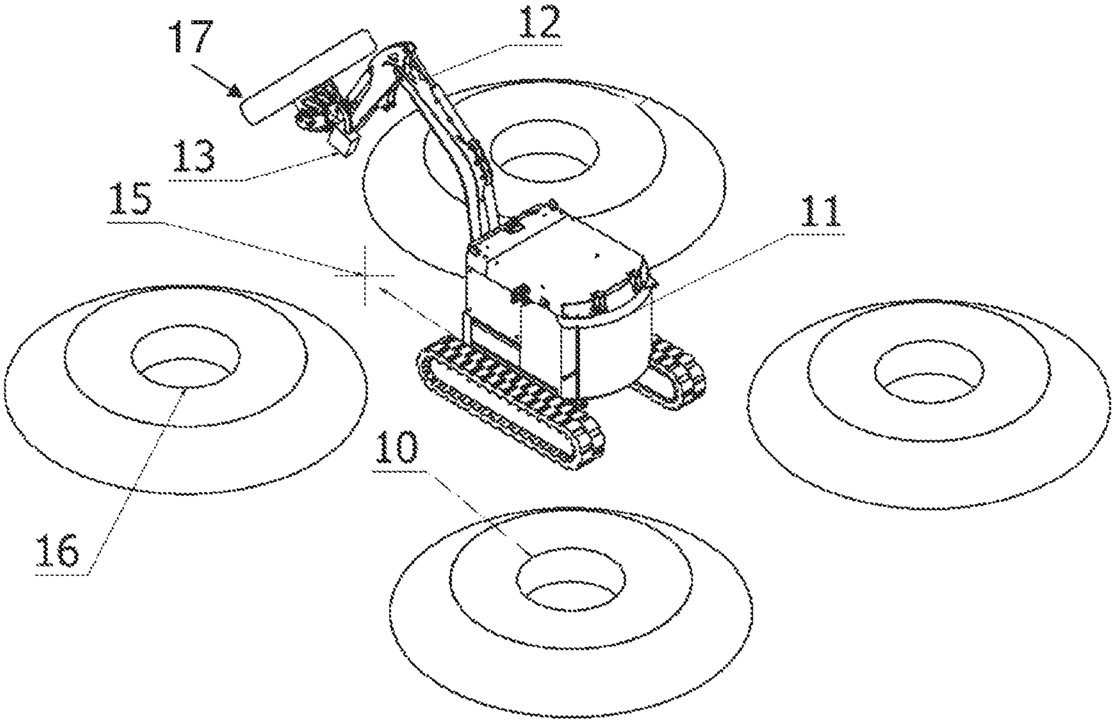

FIG. 5 illustrates a step in a method for positioning an end effector 17 relative to a drill hole 10 according to an embodiment of the present invention. Once the end effector 17 has completed the one or more operations within the drill hole 10, the arm 12 returns the scanning portion 13 to the home position. The control unit (obscured) then actuates movement of the automated vehicle 11 to a new location 15 adjacent the estimated location of a different drill hole 16. The process described above then repeats for the different drill hole 16.

By repeating the process over multiple drill holes, the present invention develops an accurate record of the location, orientation and condition of drill holes in a given area of terrain. When work (such as, but not limited to, the placement of explosives) is subsequently undertaken in the drill holes, this work can be conducted in a safe, rapid and efficient manner that substantially eliminates incorrect or ineffective placement of explosives that could occur if the location, orientation and condition of the drill holes was not accurately known.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An automated vehicle comprising:

a control unit configured to control movement of the automated vehicle to a location adjacent an estimated location of a drill hole;

a scanning portion including one or more scanning devices configured to scan an area of terrain in the vicinity of the estimated location of the drill hole in order to determine an actual location of the drill hole, and to generate a point cloud representing at least a portion of the interior of the drill hole, the point cloud generating information regarding the orientation and condition of the drill hole;

at least one arm associated with the scanning portion, the at least one arm configured to move the scanning portion between a home position and one or more scanning positions; and an end effector associated with the at least one arm, wherein, upon generating the point cloud, the end effector is selected based upon the point cloud and is configured to perform one or more operations;

wherein, upon generating the point cloud, the at least one arm is configured, based on the point cloud, to position the end effector in substantial alignment with the drill hole so that the end effector can perform the one or more operations.

2. An automated vehicle according to claim 1 wherein the automated vehicle comprises a boom and an attachment portion configured to removably attach the scanning portion to the at least one arm.

3. An automated vehicle according to claim 1 wherein the automated vehicle further comprises one or more conduits configured to provide a passageway for fluids and/or solids to flow into and/or out of the drill hole.

4. An automated vehicle according to claim 1 wherein the control unit includes, or is associated, with a GPS unit.

5. An automated vehicle according to claim 4 wherein GPS co-ordinates of one or more drill holes are known, and the control unit controls movement of the automated vehicle to a location in the vicinity of the GPS co-ordinates of the one or more drill holes.

6. An automated vehicle according to claim 1 wherein the automated vehicle further comprises a vision system.

7. An automated vehicle according to claim 6 wherein the vision system includes at least one camera configured to detect a terrain and/or identify a feature thereof.

8. An automated vehicle according to claim 7 wherein the at least one camera is positioned on the scanning portion and/or the at least one arm.

9. An automated vehicle according to claim 6 wherein data from the vision system is used by the control unit to improve movement of the automated vehicle and/or the at least one arm.

10. An automated vehicle according to claim 9 wherein the data from the vision system is used to improve accuracy of a position calculation of the automated vehicle and/or the at least one arm.

11. An automated vehicle according to claim 9 wherein the data includes scanned terrain data, sensed object data and combinations thereof.

12. An automated vehicle according to claim 1 wherein the automated vehicle is operated autonomously or semi-autonomously.

13. An automated vehicle according to claim 1 wherein the estimated location of the drill hole is determined by the automated vehicle or is provided as GPS co-ordinates.

14. An automated vehicle according to claim 1 wherein the one or more scanning devices include stereo cameras, LIDAR laser scanners, radar devices and/or acoustic devices.

15. An automated vehicle according to claim 1 wherein the point cloud includes an image representing up to 50 metres of depth of the interior of the drill hole.

16. An automated vehicle according to claim 1 wherein the point cloud is used to determine a centreline of the drill hole.

17. An automated vehicle according to claim 1 wherein the one or more operations performed by the end effector include placing one or more tools into the drill hole, remove or reduce obstructions or blockages in the drill hole, charge the drill hole with explosives and/or remove samples from the drill hole.

18. A method for positioning an end effector relative to a drill hole, the method comprising the steps of:

a. Positioning an automated vehicle adjacent an estimated location of the drill hole;

b. Scanning, using a scanning portion including one or more scanning devices associated with the automated vehicle, an area of terrain in the vicinity of the estimated location of the drill hole in order to determine an actual location of the drill hole and to generate a point cloud representing at least a portion of the interior of the drill hole, the point cloud generating information regarding the orientation and condition of the drill hole, the point cloud generating information regarding the orientation and condition of the drill hole; and Positioning, based on the point cloud, an end effector, wherein, upon generating the point cloud, the end effector is selected based upon the point cloud and is configured to perform one or more operations, in substantial alignment with the drill hole so that the end effector can perform the one or more operations.

19. A method for determining one or more parameters relating to a drill hole, the method comprising the steps of:

a. Scanning, using one or more scanning devices, an area of terrain in the vicinity of an estimated location of the drill hole in order to determine an actual location of the drill hole and to generate a point cloud representing at least a portion of the interior of the drill hole, the point cloud generating information regarding the orientation and condition of the drill hole;

b. Determining, using the point cloud, the one or more parameters relating to the drill hole, the point cloud generating information regarding the orientation and condition of the drill hole; and c. Positioning, based on the one or more parameters, an end effector configured to perform one or more operations, in substantial alignment with the drill hole so that the end effector can perform one or more operations.

20. An automated vehicle according to claim 1 wherein the one or more operations to be performed are selected based on the generated point cloud.

* * * * *